Patented Feb. 20, 1951

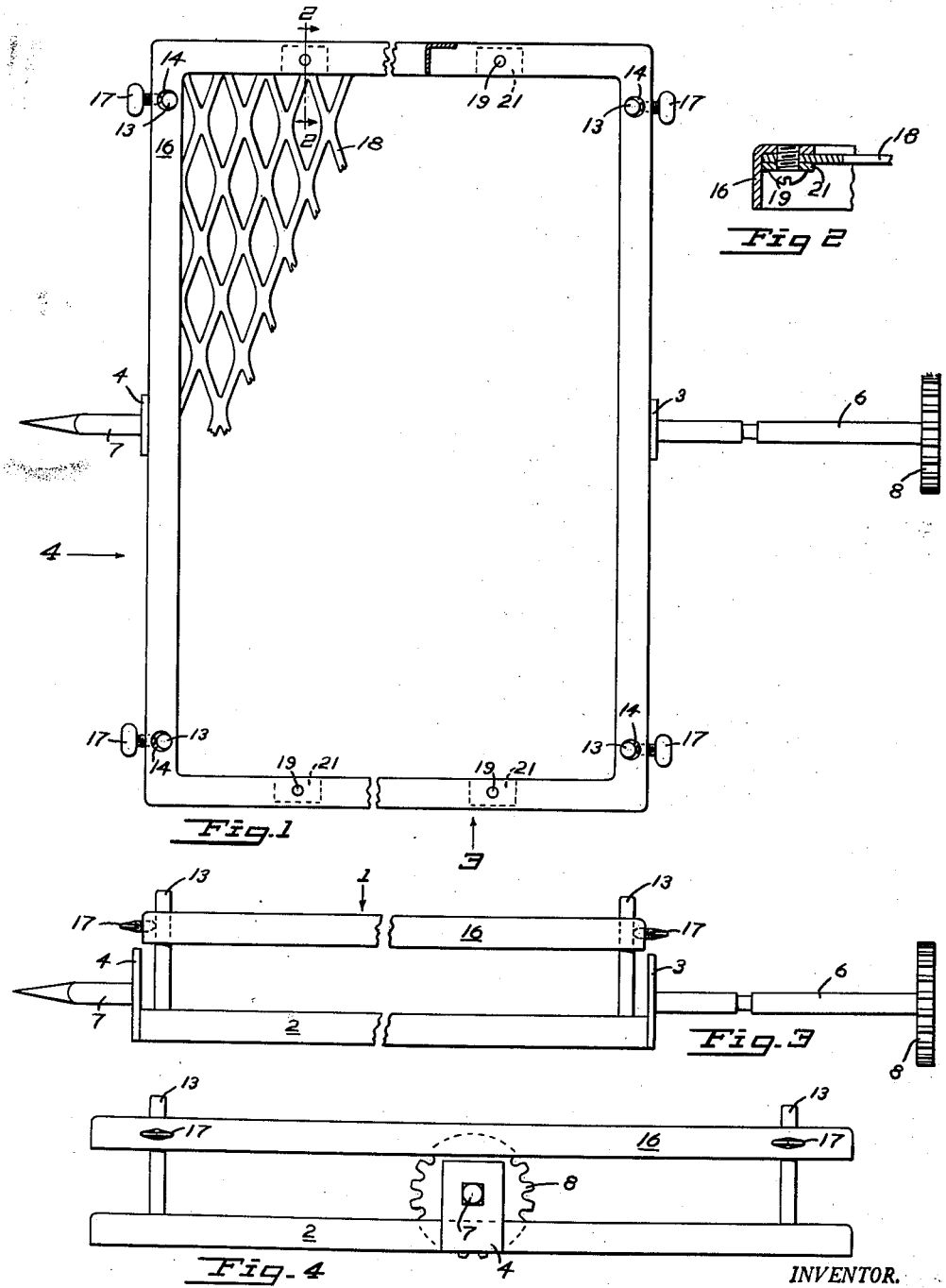

2,542,109

UNITED STATES PATENT OFFICE 2,542,109

BARBECUE GRILL STRUCTURE

Victor A. Benson, San Jose, Calif.

Application April 6, 1948, Serial No. 19,228

1 Claim. (Cl. 99—393)

My invention relates to grills for barbecue pits; and it is an object of my invention to provide a barbecue grill structure having a pair of adjustably spaced frames between which the meat to be cooked is held. It is a further object to provide such a grill structure which may be rotated about its longitudinal axis.

This invention has other objects which will be explained in that form of the invention which is illustrated in the drawings. It is to be understood, however, that my invention may readily take other forms, which are included in the scope of the appended claim.

Referring to the drawings: Figure 1 is a plan view of my barbecue grill, and the shaft and gear upon which it is mounted. Only a portion of the expanded metal grid is shown; and a portion of the frame is omitted to shorten the view.

Figure 2 is a detail in vertical section and enlarged scale of the grill frame and grid assembly, the plane of section being indicated by the line 2—2 of Figure 1.

Figure 3 is a side elevation of my grill structure; and Figure 4 is an end view.

In the barbecuing of meats and poultry, it is common to rotate a chicken or a lamb on a spit over a wood or charcoal fire, in order to cook the meat evenly on all sides. For such cuts of meat as steaks and chops, whose shape is such that they may not be readily spitted, however, even barbecuing is ensured by placing the meat on a grid and turning it over at intervals with a fork.

The need for a more efficient method for barbecuing and, in particular, the development of the motor-driven spit, my prior Patent No. 2,306,517, have led to the development of the grill structure of my invention.

My grill structure is intended to be used in conjunction with a supporting standard as, for example, the type described in my prior Patent No. 2,213,483; and includes a pair of adjustably spaced frames between which the articles to be cooked are held. The frames include means for permitting them to be rotated about their centers of gravity; and a grid for supporting the meat to be barbecued is secured to each frame.

In more specific terms, the grill structure of my invention comprises a rectangular lower frame 2 of L-shaped cross-section, which may be conveniently made from angle-iron stock. At opposite sides of the frame are centered lugs 3 and 4; and shaft 6, extending from lug 3, and pointed shaft 7, extending from lug 4, serve to mount the frame for rotation. I prefer to fix these shafts to the lugs at points which coincide with the center of balance of the grill structure, in order to make rotation of the structure as easy as possible.

The shafts are intended to be carried in bearing blocks on such a standard as indicated above; and gear 8 on the free end of shaft 6 may engage the crank- or motor-driven gear train employed to rotate the spit.

Studs 13, which may conveniently be between two and three inches long, are fixed on the frame 2, preferably near each corner; and extend upwardly through corresponding holes 14 in upper frame 16, whose construction is similar to that of the lower frame. Thumbscrews 17 are arranged on the edges of the frame so as to project into the holes and abut the studs. A sliding and adjustable relationship between the two frames is thus afforded, while the upper frame may be readily fixed in place by tightening the thumbscrews against the studs.

The angle-iron frames 2 and 16 are arranged with their included angles facing each other. Expanded metal sheets 18 are secured to the inner side of the horizontal flanges with machine screws 19 and washers 21, to provide a grid for supporting the meat; and the vertical flanges form a convenient rim about the enclosed space.

With this arrangement, it is possible to remove the upper frame and grid assembly from the grill structure, when arranging the meat upon the lower grid. They may then be replaced and adjusted to apply sufficient pressure on the meat to hold it in place while the structure is being rotated during barbecuing.

I claim:

A rotatable barbecue grill structure comprising upper and lower opposed frames, each frame consisting of four angle iron members joined to form a frame rectangular in configuration and provided with vertically and horizontally disposed flanges on its peripheral edges with the vertically disposed flanges of the upper frame extending toward the vertically disposed flanges of the lower frame to provide peripheral barrier walls around the sides of the grill when assembled, thus to obviate loss of contents held therebetween, an expanded metal grill fixed in each frame by attachment to said horizontally disposed flanges of each frame, a lug fixed at the center of each of two opposite sides of the lower frame and extending toward the upper frame, a pair of aligned shafts for rotatably mounting the grill structure fixed on the lugs and extending outwardly from the frame on each side, the shafts being at approximately the center of balance of the grill structure, spaced studs fixed in each of the corners of the lower frame and extending through apertures in corresponding corners of the upper frame, screws extending through the vertically disposed flanges in the upper frame and engaging said studs in the lower frame and adjustably fixing the frames in spaced relation, and a driven gear fixed on one of the shafts.

VICTOR A. BENSON.

REFERENCES CITED

The following references are of record in the file of this patent:

UNITED STATES PATENTS

| Number | Name | Date |
|---|---|---|
| 173,503 | Schrankel | Feb. 15, 1876 |
| 914,159 | McCaughey | Mar. 2, 1909 |
| 1,345,590 | Ford | July 6, 1920 |
| 1,738,972 | Strader | Dec. 10, 1929 |
| 1,762,257 | Burkhardt | June 10, 1930 |
| 1,903,324 | Codling | Apr. 4, 1933 |
| 2,144,918 | Garvis | Jan. 24, 1939 |
| 2,297,825 | Bobo | Oct. 6, 1942 |